United States Patent
Zhang et al.

(10) Patent No.: US 10,455,302 B2
(45) Date of Patent: Oct. 22, 2019

(54) METHOD AND APPARATUS FOR ADJUSTING WAVELENGTH FOR OPTICAL LINE TERMINAL OR OPTICAL NETWORK UNIT

(71) Applicant: ZTE Corporation, Shenzhen (CN)

(72) Inventors: Dezhi Zhang, Shenzhen (CN); Liquan Yuan, Shenzhen (CN); Weiliang Zhang, Shenzhen (CN); Dan Geng, Shenzhen (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 3 days.

(21) Appl. No.: 15/118,646

(22) PCT Filed: Jul. 23, 2014

(86) PCT No.: PCT/CN2014/082845
§ 371 (c)(1),
(2) Date: Aug. 12, 2016

(87) PCT Pub. No.: WO2015/120695
PCT Pub. Date: Aug. 20, 2015

(65) Prior Publication Data
US 2017/0055053 A1   Feb. 23, 2017

(30) Foreign Application Priority Data
Feb. 12, 2014   (CN) .......................... 2014 1 0049305

(51) Int. Cl.
*H04Q 11/00*   (2006.01)
*H04J 14/02*   (2006.01)
(52) U.S. Cl.
CPC ...... *H04Q 11/0067* (2013.01); *H04J 14/0223* (2013.01); *H04J 14/0238* (2013.01);
(Continued)

(58) Field of Classification Search
CPC ....... H04Q 11/0067; H04Q 2011/0086; H04Q 2011/0088; H04Q 2213/1301; H04J 14/0238; H04J 14/0223
See application file for complete search history.

(56) References Cited

U.S. PATENT DOCUMENTS

2007/0293224 A1* 12/2007 Wang ................ H04W 36/0055
455/436
2013/0315589 A1   11/2013 Gao et al.
(Continued)

FOREIGN PATENT DOCUMENTS

CN   101473677 A   7/2009
CN   102082611 A   6/2011
(Continued)

OTHER PUBLICATIONS

International Search Report for corresponding application No. PCT/CN2014/082845 filed on Jul. 23, 2014: dated Nov. 4, 2014.
(Continued)

*Primary Examiner* — Leslie C Pascal
(74) *Attorney, Agent, or Firm* — Cantor Colburn LLP

(57) ABSTRACT

The disclosure provides a method and apparatus for adjusting wavelength for an Optical Line Terminal/Optical Network Unit (OLT/ONU). The method for adjusting wavelength for an OLT includes that: a source OLT sends an adjustment notification message to a target OLT, wherein the adjustment notification message is used for indicating that an ONU is to be adjusted into a Time-Wavelength Division Multiplexing Channel (TWDM CH) of the target OLT; and the source OLT receives an adjustment acknowledgement message provided by the target OLT, wherein the adjustment acknowledgement message is used for indicating that an adjustment process of the ONU has been completed. By means of the technical solution provided in the disclosure, an ONU of a source OLT can still work normally after being (Continued)

switched to a channel of a target OLT, thereby achieving the effect that the continuity of a service between the OLT and the ONU may be maintained.

17 Claims, 6 Drawing Sheets

(52) U.S. Cl.
 CPC ........... *H04Q 2011/0086* (2013.01); *H04Q 2011/0088* (2013.01); *H04Q 2213/1301* (2013.01)

(56) References Cited

U.S. PATENT DOCUMENTS

| | | | |
|---|---|---|---|
| 2015/0207585 A1* | 7/2015 | Luo | H04J 14/0256 398/72 |
| 2017/0117984 A1* | 4/2017 | Luo | H04J 14/0257 |
| 2017/0163370 A1* | 6/2017 | Gao | H04J 14/0236 |

FOREIGN PATENT DOCUMENTS

| | | |
|---|---|---|
| CN | 102870433 A | 1/2013 |
| CN | 103118309 A | 5/2013 |
| CN | 103248431 A | 8/2013 |
| CN | 103391486 A | 11/2013 |
| JP | 2013207715 A | 10/2013 |
| JP | 2013207717 A | 10/2013 |
| JP | 2013229743 A | 11/2013 |
| WO | 2007149509 A2 | 12/2007 |

OTHER PUBLICATIONS

Supplemental European Search Report dated Dec. 19, 2016 re: Application No. EP 14 88 2673, pp. 1-7, citing: Peter Dawes, US 2013/315589 A1 and JP 2013 229743.
Peter Dawes Vodafone Group: "Draft G.989.3 TC layer for NG-PON2", ITU-T Draft; Study Period 2013-2016, International Telecommunication Union, Feb. 11, 2014, vol. 2, No. 15, pp. 1-148 XP044077002.
CN Search Report, CN Application 2014100493051, 1 page.
JP Office Action, JP Application No. 20160551836, 2 pages.

* cited by examiner

METHOD AND APPARATUS FOR ADJUSTING WAVELENGTH FOR OPTICAL LINE TERMINAL OR OPTICAL NETWORK UNIT

TECHNICAL FIELD

The embodiments of the disclosure relate to the field of communications, and in particular to a method and apparatus for adjusting wavelength for an Optical Line Terminal or an optical network unit.

BACKGROUND

In a Next Generation-Passive Optical Network (NG-PON) system, a plurality of Time-Wavelength Division Multiplexing Channels (TWDM CH) exist, each TWDM CH having at least one Uplink Shared Channel (US CH) and a Downlink Shared Channel (DS CH); each TWDM CH has, at least, a transceiver apparatus containing a receiver, a transmitter and corresponding MAC processing logics, similar to an OLT in an era of a traditional Time Division Multiplexing (TDM) PON, for processing; and transceiver apparatuses of different TWDM CHs may be integrated in a PON line card or may also be distributed in different PON line cards.

In a multi-wavelength TWDM PON system, it is necessary to support switching of an ONU in different TWDM CHs based on a great diversity of demands. For example, it is required that an OLT port is energy-saving (when there are few users, a user working on a TWDM CH corresponding to a certain OLT transceiver apparatus is adjusted into other TWDM CHs in a wavelength switching mode, thereby closing an idle OLT transceiver apparatus to achieve an energy-saving effect). For example, in a fault handling process of an OLT, a certain ONU is adjusted into an additional TWDM CH from an initial TWDM CH so as to judge a tuning ability and the like of the ONU. In a tuning process of the ONU, the communication of a currently-working TWDM CH transceiver apparatus is interrupted substantially, and a wavelength is adjusted to establish communication with a target TWDM CH transceiver apparatus. Consequently, communication channels and information interactions are needed between the currently-working TWDM CH transceiver apparatus and the target TWDM CH transceiver apparatus to guarantee mutual understanding and service configuration continuity, so as to enable the ONU to still work normally after being switched. The difficulty and complexity of communications and information interactions are different in different implementations of transceiver apparatuses. That is, if OLT transceiver apparatuses are all integrated inside a line card or even a component, the abovementioned communications will become internally implemented mechanisms without intercommunications; but if OLT apparatuses are scattered in different line cards or even different machine frames, these communications will need to be transmitted via an external network, and if these TWDM CH transceiver apparatuses are provided by suppliers of different manufacturers, it is necessary to research how to guarantee mutual understanding therebetween.

However, effective communication channels and information interaction logics are not provided for such communications in a currently existing TWDM PON standard and technical research.

SUMMARY

The embodiments of the disclosure provide a method and apparatus for adjusting wavelength for an OLT/ONU, which are intended to solve the above problems.

According to one embodiment of the disclosure, a method for adjusting wavelength for an OLT is provided, which may include that: a source OLT sends an adjustment notification message to a target OLT, wherein the adjustment notification message is used for indicating that an ONU is to be adjusted into a TWDM CH of the target OLT; and the source OLT receives an adjustment acknowledgement message provided by the target OLT, wherein the adjustment acknowledgement message is used for indicating that an adjustment process of the ONU has been completed.

In an embodiment of the disclosure, the adjustment notification message may carry a logical identification number of the ONU and channel information about the TWDM CH of the target OLT.

In an embodiment of the disclosure, the source OLT may send an adjustment command message to the ONU and may start a preset timer of the source OLT, wherein the adjustment command message is used for instructing to adjust the ONU into the TWDM CH of the target OLT; the source OLT timer is used for indicating that the adjustment process of the ONU fails when the preset timer expires; and the type of the adjustment command message includes: a Physical Layer Operation And Maintenance (PLOAM) message.

In an embodiment of the disclosure, the adjustment command message may carry channel information about the TWDM CH of the target OLT and wavelength adjustment start time.

In an embodiment of the disclosure, the method may further include that: under the condition that the preset timer expires, the source OLT sends an adjustment error message to the target OLT, wherein the type of the adjustment error message includes: an Inter-OLT-Communication (IOC) message.

In an embodiment of the disclosure, the method may further include that: under the condition that the source OLT receives an adjustment refusal message from the ONU, the source OLT sends an adjustment cancellation message to the target OLT; or, the source OLT receives an adjustment acknowledgement message from the ONU, wherein the type of the adjustment cancellation message includes: an IOC message; and types of the adjustment refusal message and the adjustment acknowledgement message include: PLOAM messages.

In an embodiment of the disclosure, the method may further include that: the source OLT receives a return message sent by the ONU, wherein the return message is a report sent to the source OLT by the ONU after adjustment fails, and the type of the return message includes: a PLOAM message.

In an embodiment of the disclosure, types of the adjustment notification message and the adjustment acknowledgement message include: IOC messages; and the type of the adjustment command message includes: a PLOAM message.

According to another embodiment of the disclosure, a apparatus for adjusting wavelength by an OLT is provided, which may be located at a source OLT and may include: a first sending component, configured to send an adjustment notification message to a target OLT, wherein the adjustment notification message is used for indicating that an ONU is to be adjusted into a TWDM CH of the target OLT; and a receiving component, configured to receive an adjustment acknowledgement message provided by the target OLT, wherein the adjustment acknowledgement message is used for indicating that an adjustment process of the ONU has been completed.

In an embodiment of the disclosure, the adjustment notification message may carry a logical identification number of the ONU and channel information about the TWDM CH of the target OLT.

In an embodiment of the disclosure, the apparatus may further include: a second sending component, configured to send an adjustment command message to the ONU needing to be adjusted, wherein the adjustment command message is used for indicating that the ONU needing to be adjusted is adjusted into the TWDM CH of the target OLT, and the type of the adjustment command message includes: a PLOAM message; and a start component, configured to start a preset timer of the source OLT, wherein the source OLT timer is used for indicating that the adjustment process of the ONU fails when the preset timer expires.

In an embodiment of the disclosure, the adjustment command message may carry channel information about the TWDM CH of the target OLT and wavelength adjustment start time.

According to another embodiment of the disclosure, a method for adjusting wavelength for an OLT is provided, which may include that: a target OLT receives an adjustment notification message sent by a source OLT, and starts a preset timer of the target OLT, wherein the adjustment notification message is used for indicating that an ONU is to be adjusted into a TWDM CH of the target OLT, and the target OLT timer is used for indicating that an adjustment process of the ONU fails when the preset timer expires; and the target OLT sends an adjustment acknowledgment message to the source OLT, wherein the adjustment acknowledgment message is used for indicating that the adjustment process of the ONU has been completed.

In an embodiment of the disclosure, the adjustment notification message may carry a logical identification number of the ONU needing to be adjusted and channel information about the TWDM CH of the source OLT.

In an embodiment of the disclosure, types of the adjustment notification message and the adjustment acknowledgment message may include: IOC messages.

According to another embodiment of the disclosure, a apparatus for adjusting wavelength by an OLT is provided, which may be located at a target OLT and may include: a receiving component, configured to receive an adjustment notification message sent by a source OLT, wherein the adjustment notification message is used for indicating that an ONU is to be adjusted into a TWDM CH of the target OLT; a start component, configured to start a preset timer of the target OLT, wherein the target OLT timer is used for indicating that an adjustment process of the ONU fails when the preset timer expires; and a sending component, configured to send an adjustment acknowledgment message to the source OLT, wherein the adjustment acknowledgment message is used for indicating that the adjustment process of the ONU has been completed.

According to another embodiment of the disclosure, a method for adjusting wavelength for an ONU is provided, which may include that: an ONU sends an adjustment acknowledgment message to a source OLT and enters an adjustment waiting state; and when a downlink out-of-synchronization event is detected before wavelength adjustment start time indicated by the source OLT arrives the ONU enters an intermittent de-synchronization state, or, after the wavelength adjustment start time arrives, the ONU enters an adjustment operation state.

In an embodiment of the disclosure, the method may further include that: after the adjustment operation state is ended, the ONU sends an adjustment acknowledgment message or a return message to the source OLT, wherein the adjustment acknowledgment message is used for indicating that an adjustment process of the ONU has been completed, and the return message is a report sent to the source OLT by the ONU after adjustment fails.

According to another embodiment of the disclosure, a apparatus for adjusting wavelength for an ONU is provided, which may be located at an ONU and may include: a sending component, configured to send an adjustment acknowledgment message to a source OLT and enter an adjustment waiting state; and a processing component, configured to enter an intermittent de-synchronization state when a downlink out-of-synchronization event is detected before wavelength adjustment start time indicated by the source OLT arrives or enter an adjustment operation state after the wavelength adjustment start time arrives.

By means of the disclosure, in a mode of setting corresponding communication channels and information interaction logics on a source OLT, an ONU of the source OLT and a target OLT simultaneously, the problem that effective communication channels and information interaction logics are not provided for such communications in a currently existing TWDM PON standard and technical research is solved, so that the ONU of the source OLT can still work normally after being switched to a channel of the target OLT, thereby achieving the effect that the continuity of a service between the OLT and the ONU may be maintained.

BRIEF DESCRIPTION OF THE DRAWINGS

The drawings illustrated herein are intended to provide further understanding of the disclosure, and constitute a part of the disclosure. The schematic embodiments and illustrations of the disclosure are intended to explain the disclosure, and do not form improper limits to the disclosure. In the drawings.

DETAILED DESCRIPTION OF THE EMBODIMENTS

The disclosure will be illustrated below with reference to the drawings and the embodiments in detail. It is important to note that the embodiments of the disclosure and the characteristics in the embodiments can be combined under the condition of no conflicts.

Figure 1:
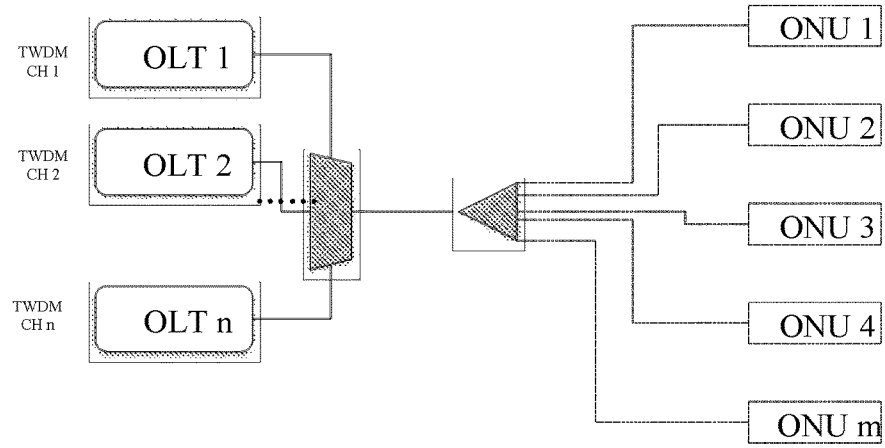
FIG. 1 is a diagram of a system framework according to the relevant art.
Figure 2:
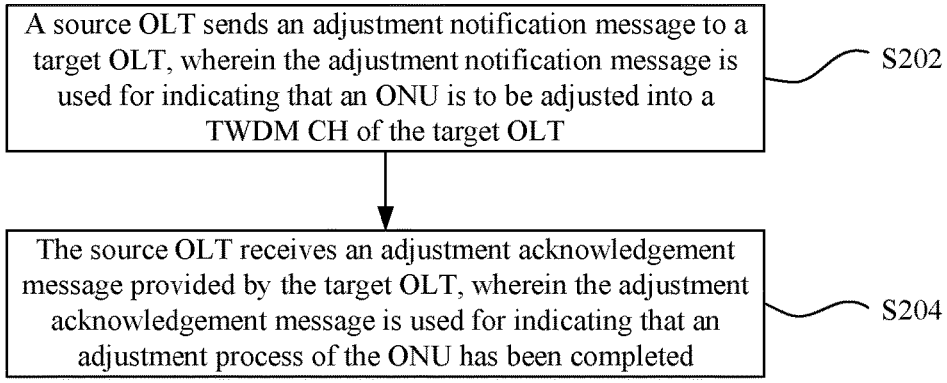
FIG. 2 is a flow chart of a method for adjusting wavelength for an OLT according to an embodiment 1 of the disclosure.

An embodiment 1 of the disclosure provides a method for adjusting wavelength for an OLT, which may be applied to a source OLT. FIG. 2 is a flow chart of a method for adjusting wavelength for an OLT according to an embodiment 1 of the disclosure. As shown in FIG. 2, the method mainly includes the steps (Step S202 to Step S204) as follows.

Step S202: A source OLT sends an adjustment notification message to a target OLT, wherein the adjustment notification message is used for indicating that an ONU is to be adjusted into a TWDM CH of the target OLT.

Step S204: The source OLT receives an adjustment acknowledgement message provided by the target OLT, wherein the adjustment acknowledgement message is used for indicating that an adjustment process of the ONU has been completed.

By means of both the above steps, before it is indicated that the ONU is adjusted to the target OLT, the source OLT notifies the target OLT in order that the target OLT gets ready for receiving the ONU, and if the ONU is successfully adjusted into the channel of the target OLT, the source OLT may determine, according to the adjustment acknowledgement message fed back by the target OLT, that the ONU is successfully adjusted.

In the embodiment 1, the adjustment notification message may carry a logical identification number of the ONU and channel information about the TWDM CH of the target OLT. In such a way, the target OLT determines the corresponding ONU according to the logical identification number of the ONU.

In the embodiment 1, the source OLT may also send an adjustment command message to the ONU and may start a preset timer of the source OLT, wherein the adjustment command message is used for instructing to adjust the ONU into the TWDM CH of the target OLT; the source OLT timer is used for indicating that the adjustment process of the ONU fails when the preset timer expires; and the type of the adjustment command message includes: a PLOAM message.

In the embodiment 1, the adjustment command message may carry channel information about the TWDM CH of the target OLT and wavelength adjustment start time. In such a way, the ONU may execute wavelength adjustment according to the wavelength adjustment start time.

In the embodiment 1, under the condition that the preset timer expires, the source OLT may also send an adjustment error message to the target OLT, wherein the type of the adjustment error message includes: an IOC message. Certainly, in practical application, this message type is not limited.

In the embodiment 1, under the condition that the source OLT receives an adjustment refusal message from the ONU, the source OLT may send an adjustment cancellation message to the target OLT; or, the source OLT receives an adjustment acknowledgement message from the ONU, wherein the type of the adjustment cancellation message includes: an IOC message; and types of the adjustment refusal message and the adjustment acknowledgement message include: PLOAM messages. Certainly, in practical application, these message types are not limited.

In the embodiment 1, the source OLT may receive a return message sent by the ONU, wherein the return message is a report sent to the source OLT by the ONU after adjustment fails; and the type of the return message may include: a PLOAM message. Certainly, in practical application, this message type is not limited.

In the embodiment 1, types of the adjustment notification message and the adjustment acknowledgement message may include: IOC messages; and the type of the adjustment command message includes: a PLOAM message. Certainly, in practical application, these message types are not limited.

It is important to note that in practical application, the type of each message is not limited, and any other applicable message types may be used.

Figure 3:
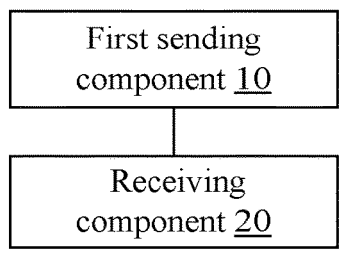
FIG. 3 is a structure block diagram of a apparatus for adjusting wavelength by an OLT according to an embodiment 1 of the disclosure.

The embodiment 1 of the disclosure provides a apparatus for adjusting wavelength by an OLT, which is located at a source OLT so as to implement the method for adjusting wavelength for an OLT shown in FIG. 2. FIG. 3 is a structure block diagram of a apparatus for adjusting wavelength by an OLT according to an embodiment 1 of the disclosure. As shown in FIG. 3, the apparatus may include: a first sending component 10 and a receiving component 20, wherein the first sending component 10 is configured to send an adjustment notification message to a target OLT, the adjustment notification message being configured to indicate that an ONU is to be adjusted into a TWDM CH of the target OLT; and the receiving component 20 is configured to receive an adjustment acknowledgement message provided by the target OLT, the adjustment acknowledgement message being configured to indicate that an adjustment process of the ONU has been completed.

In an embodiment of the disclosure, the adjustment notification message may carry a logical identification number of the ONU and channel information about the TWDM CH of the target OLT.

Figure 4:
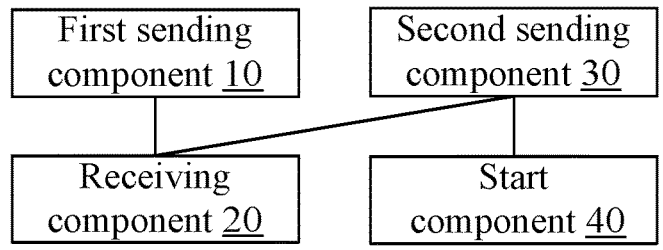
FIG. 4 is a structure block diagram of a preferred apparatus for adjusting wavelength by an OLT according to an embodiment 1 of the disclosure.

On the basis of the apparatus for adjusting wavelength by an OLT shown in FIG. 3, the embodiment 1 of the disclosure also provides a preferred apparatus for adjusting wavelength by an OLT. FIG. 4 is a structure block diagram of a preferred apparatus for adjusting wavelength by an OLT according to an embodiment 1 of the disclosure. As shown in FIG. 4, the preferred apparatus for adjusting wavelength by an OLT also includes: a second sending component 30, configured to send an adjustment command message to an ONU needing to be adjusted, wherein the adjustment command message is used for indicating that the ONU needing to be adjusted is adjusted into a TWDM CH of a target OLT, and the type of the adjustment command message includes: a PLOAM message; and a start component 40, configured to start a preset timer of the source OLT, wherein the source OLT timer is used for indicating that the adjustment process of the ONU fails when the preset timer expires.

In an embodiment of the disclosure, the adjustment command message may carry channel information about the TWDM CH of the target OLT and wavelength adjustment start time.

Figure 5:
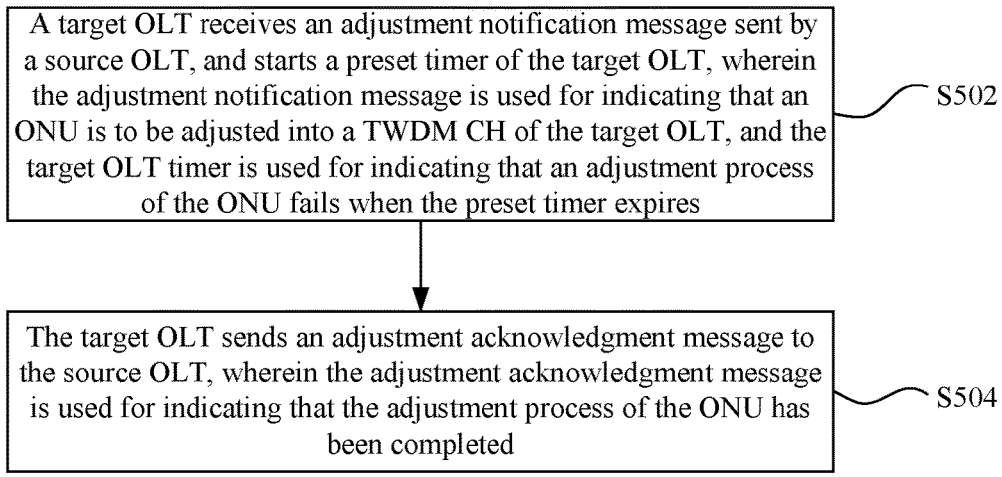
FIG. 5 is a flow chart of a method for adjusting wavelength for an OLT according to an embodiment 2 of the disclosure.

An embodiment 2 of the disclosure provides a method for adjusting wavelength for an OLT, which may be applied to a target OLT. FIG. 5 is a flow chart of a method for adjusting wavelength for an OLT according to an embodiment 2 of the disclosure. As shown in FIG. 5, the method mainly includes the steps (Step S502 to Step S504) as follows.

Step S502: A target OLT receives an adjustment notification message sent by a source OLT, and starts a preset timer of the target OLT, wherein the adjustment notification message is used for indicating that an ONU is to be adjusted into a TWDM CH of the target OLT, and the target OLT timer is used for indicating that an adjustment process of the ONU fails when the preset timer expires.

Step S504: The target OLT sends an adjustment acknowledgment message to the source OLT, wherein the adjustment acknowledgment message is used for indicating that the adjustment process of the ONU has been completed.

By means of both the above steps, the target OLT may wait for the ONU to be adjusted after the timer is started; if the timer does not expire, the ONU is successfully adjusted into the channel of the target OLT, and the target OLT may notify the source OLT that adjustment has been completed; and if the timer expires, the ONU is not adjusted into the channel of the target OLT, and the target OLT considers that the adjustment process of the ONU fails.

In the embodiment 2, the adjustment notification message may carry a logical identification number of the ONU needing to be adjusted and channel information about the TWDM CH of the source OLT.

In the embodiment 2, types of the adjustment notification message and the adjustment acknowledgment message may include: IOC messages. Certainly, in practical application, a message type is not limited to the types described herein.

Figure 6:
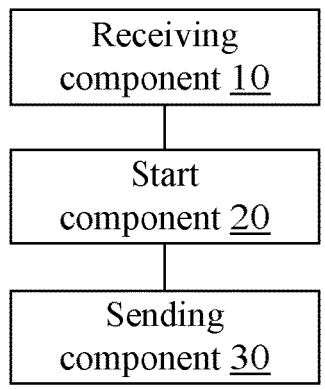
FIG. 6 is a structure block diagram of a apparatus for adjusting wavelength by an OLT according to an embodiment 2 of the disclosure.

The embodiment 2 of the disclosure also provides a apparatus for adjusting wavelength by an OLT, which is located at a target OLT so as to implement the method for adjusting wavelength for an OLT shown in FIG. 5. FIG. 6 is a structure block diagram of a apparatus for adjusting wavelength by an OLT according to an embodiment 2 of the disclosure. As shown in FIG. 6, the apparatus may include: a receiving component 10, a start component 20 and a sending component 30, wherein the receiving component 10 is configured to receive an adjustment notification message sent by a source OLT, the adjustment notification message being configured to indicate that an ONU is to be adjusted into a TWDM CH of the target OLT; the start component 20 is configured to start a preset timer of the target OLT, the target OLT timer being configured to indicate that an adjustment process of the ONU fails when the preset timer expires; and the sending component 30 is configured to send an adjustment acknowledgment message to the source OLT, the adjustment acknowledgment message being configured to indicate that the adjustment process of the ONU has been completed.

Figure 7:
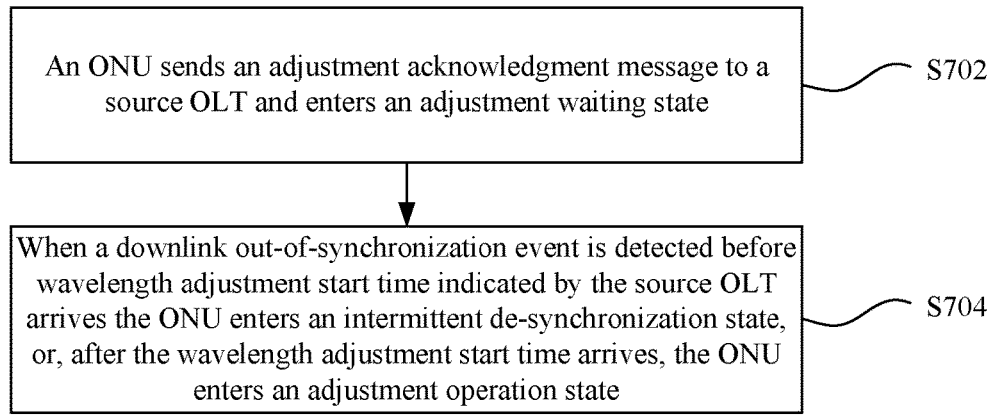
FIG. 7 is a flow chart of a method for adjusting wavelength for an ONU according to an embodiment 3 of the disclosure.

An embodiment 3 of the disclosure provides a method for adjusting wavelength for an ONU, which may be applied to an ONU. FIG. 7 is a flow chart of a method for adjusting wavelength for an ONU according to an embodiment 3 of the disclosure. As shown in FIG. 7, the method mainly includes the steps (Step S702 to Step S704) as follows.

Step S702: An ONU sends an adjustment acknowledgment message to a source OLT and enters an adjustment waiting state.

Step S704: When a downlink out-of-synchronization event is detected before wavelength adjustment start time indicated by the source OLT arrives the ONU enters an intermittent de-synchronization state, or, after the wavelength adjustment start time arrives, the ONU enters an adjustment operation state.

By means of both the above steps, when it is confirmed that an adjustment process may be performed, the ONU may enter different preset working states at different moments according to different conditions so as to facilitate action execution in a condition process.

In the embodiment 3, after the adjustment operation state is ended, the ONU may also send an adjustment acknowledgment message or a return message to the source OLT, wherein the adjustment acknowledgment message is used for indicating that the adjustment process of the ONU has been completed, and the return message is a report sent to the source OLT by the ONU after adjustment fails.

Figure 8:
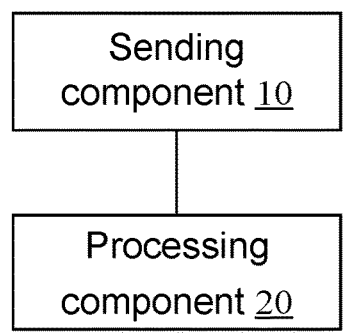
FIG. 8 is a structure block diagram of a apparatus for adjusting wavelength for an ONU according to an embodiment 3 of the disclosure.

The embodiment 3 of the disclosure also provides a apparatus for adjusting wavelength for an ONU, which is located at an ONU so as to implement the method for adjusting wavelength for an ONU shown in FIG. 7. FIG. 8 is a structure block diagram of a apparatus for adjusting wavelength for an ONU according to an embodiment 3 of the disclosure. As shown in FIG. 8, the apparatus includes: a sending component 10 and a processing component 20, wherein the sending component 10 is configured to send an adjustment acknowledgment message to a source OLT and enter an adjustment waiting state; and the processing component 20 is configured to enter an intermittent de-synchronization state when a downlink out-of-synchronization event is detected before wavelength adjustment start time indicated by the source OLT arrives or enter an adjustment operation state after the wavelength adjustment start time arrives.

By means of the wavelength adjustment method and apparatus for an OLT/ONU provided by the above embodiments, an ONU of a source OLT can still work normally after being switched to a channel of a target OLT, thereby achieving the effect that the continuity of a service between the OLT and the ONU may be maintained.

The wavelength adjustment method and apparatus for an OLT provided by the embodiment 1 and the embodiment 2 and the wavelength adjustment method and apparatus for an ONU provided by the embodiment 3 will be described and illustrated below with reference to FIG. 9 to FIG. 12 and a preferred embodiment in more detail.

Preferred Embodiment

It is important to note that in the following preferred embodiment, working of a transceiver apparatus of an OLT is divided into two parts to be described: a transceiver apparatus of a source TWDM CH1 (OLT1, wavelength CH being USCH-1 and DSCH-1) and a transceiver apparatus of a target TWDM CH (OLT2, wavelength CH being USCH-2 and DSCH-2), wherein an ONU 100 works on the TWDM CH1 of the OLT1, and is getting ready for executing a command for transferring from the OLT1 to the TWDM CH2 of the OLT2.

In order to make it easy to understand, some abbreviations in the following texts of the description and the corresponding drawings are illustrated here firstly.

IOC is an abbreviation of Inter-OLT-Communication, representing communications between an OLT1 and an OLT2.

T_ind is a message parameter, referring to a wavelength adjustment request.

ONU-ID is a logical identification number of an ONU, being unique in an OLT system (containing an OLT1 and an OLT2).

SFC is an abbreviation of a Scheduled Frame Counter, indicating wavelength adjustment start time of an ONU in a direct or indirect mode. That is, the SFC is configured to indicate that the ONU starts to be adjusted at predetermined time. A downlink frame is 125 microseconds per frame so as to be represented by a frame number. In addition, there are two time identification modes, one referring to expression (similar to a mode of designating time accurate to hour/minute so as to order an ONU to start actual wavelength adjustment) via a frame number (SFC=absolute value), and the other one being a relative mode (similar to a mode of telling an ONU to perform, starting from a certain frame number, wavelength adjustment after an SFC frame). The two modes are both available, which are not limited here.

T_C is a wavelength adjustment control message sent to an ONU by an OLT.

T_R is a corresponding feedback message sent to an OLT by an ONU, carried contents being determined according to scenarios and steps.

CH is an abbreviation of a channel, that is, the above-mentioned TWDM channel, referring to a DSCH in the TWDM CH in default in a downlink sending scenario, and referring to a USCH in the TWDM CH in default in an uplink receiving scenario.

CH1 refers to a TWDM CH number of a source OLT1.

CH2 refers to a TWDM CH number of a target OLT2.

PLOAM is an abbreviation of physical-layer-OAM, referring to a physical layer operation and maintenance message.

In the preferred embodiment, for an OLT1, a state machine may have two implementation solutions, one being a detailed solution (shown in FIG. 9), and the other one being a simple solution (shown in FIG. 10), which will be described below respectively.

Figure 11:
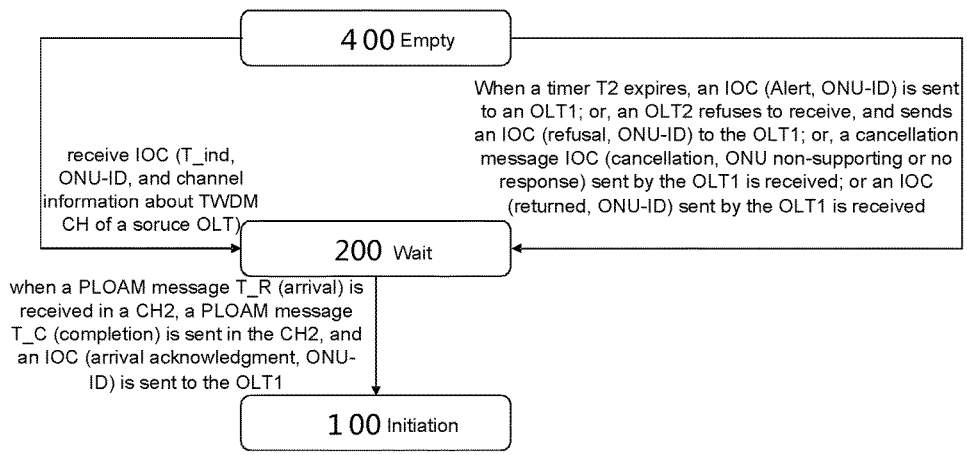
FIG. 11 is a flow diagram illustrating state transfer of a target OLT1 state machine according to a preferred embodiment of the disclosure.

For an OLT2, the state machine has a unified implementation solution (shown in FIG. 11).

Figure 9:
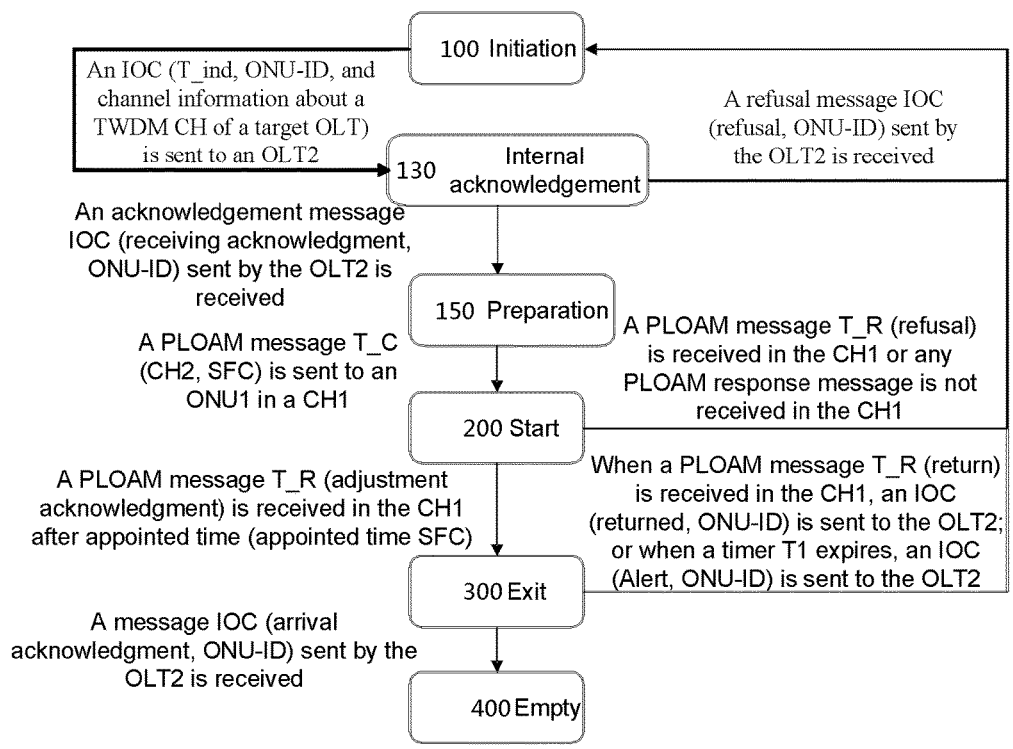
FIG. 9 is a detailed flow diagram illustrating state transfer of a source OLT1 state machine according to a preferred embodiment of the disclosure.

FIG. 9 is a detailed flow diagram illustrating state transfer of a source OLT1 state machine according to a preferred embodiment of the disclosure. As shown in FIG. 9, the state machine is described as follows.

State 100 of initiation: an OLT1 creates the state (serving as an initial state of wavelength adjustment) for an ONU associated therewith.

State 130 of internal acknowledgement: the OLT1 waits for a receiving acknowledgment message from an OLT2.

State 150 of preparation: the OLT1 receives the receiving acknowledgment message from the OLT2.

State 200 of start: the OLT1 indicates that the ONU performs wavelength adjustment to a target OLT2 at predetermined time, and a timer T1 is started.

State 300 of exit: the OLT1 waits for a result message about wavelength adjustment of the ONU.

State 400 of empty: it is a default state created for an ONU-ID no longer working at the OLT1.

Referring to FIG. 9, the working flow of the detailed solution may include the steps as follows.

Step 1: An OLT1 creates a state 100 of initiation for an ONU associated therewith.

Step 2: The OLT1 sends an IOC (T_ind, ONU-ID, and channel information about a TWDM CH of a target OLT) to an OLT2, wherein it is shown that the ONU corresponding to a designated ONU-ID is adjusted into the OLT2.

Step 3: After Step 2 is completed, the OLT enters a state 130 of internal acknowledgement.

Step 4: If the OLT1 receives a refusal message IOC (refusal, ONU-ID) sent by the OLT2, the OLT1 returns to the state 100 of initiation, and it is shown that adjustment cannot be performed and it is necessary to wait for a next adjustment operation; and if the OLT1 receives an acknowledgement message IOC (receiving acknowledgment, ONU-ID) sent by the OLT2, it is shown that the OLT2 has been ready for accepting transfer of the ONU, and the OLT1 enters a state 150 of preparation.

Step 5: The OLT1 sends a PLOAM message T_C (CH2, SFC) to an ONU1 in a CH1, requests to start being adjusted into a CH2 to work at predetermined time designated by an SFC, and enters a state 200 of start, and a timer T1 is started.

Step 6: If the OLT1 receives a PLOAM message T_R (refusal) in the CH1 or does not receive any PLOAM response message in the CH1, the OLT1 returns to the state 100 of initiation, and it is shown that adjustment does not succeed and it is necessary to wait for a next adjustment operation; and if there OLT1 receives a PLOAM message T_R (adjustment acknowledgment) in the CH1, after appointed time (appointed time SFC), the OLT1 enters a state 300 of exit.

Step 7: If the OLT1 receives a message IOC (arrival acknowledgment, ONU-ID) sent by the OLT2, it may be confirmed that the ONU has successfully worked in the OLT2, and the OLT1 enters a state 400 of empty; otherwise, if the OLT1 receives a PLOAM message T_R (return) in the CH1, the OLT1 sends an IOC (returned, ONU-ID) to the OLT2; and if a timer T1 expires, the OLT1 sends an IOC (Alert, ONU-ID) to the OLT2, and it is shown that the ONU has returned to the OLT1 and it is unnecessary for the OLT2 to keep waiting.

Figure 10:
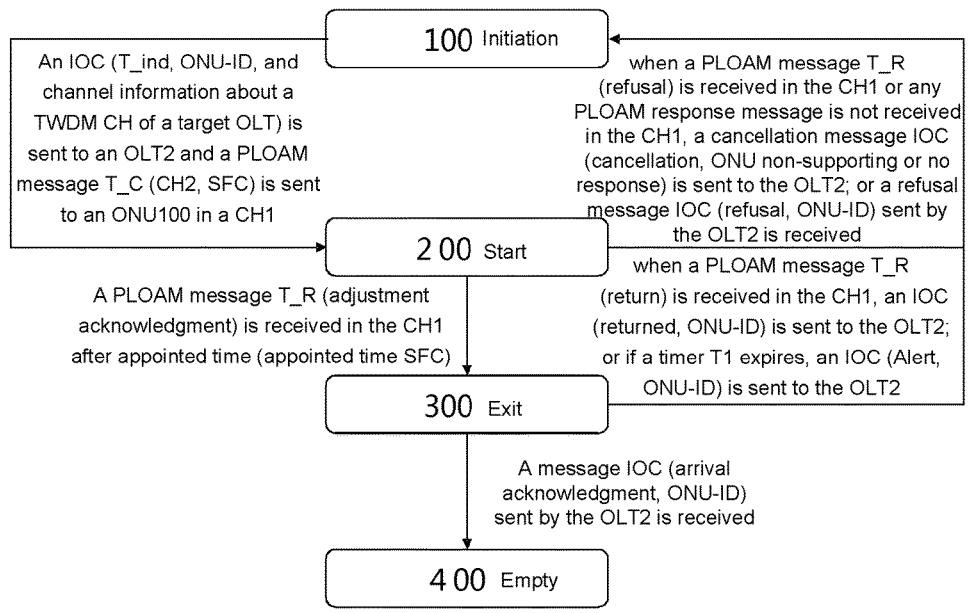
FIG. 10 is a simple flow diagram illustrating state transfer of a source OLT1 state machine according to a preferred embodiment of the disclosure.

FIG. 10 is a simple flow diagram illustrating state transfer of a source OLT1 state machine according to a preferred embodiment of the disclosure. Referring to FIG. 10, the working flow of the simple solution may include the steps as follows.

Step 1: An OLT1 creates a state 100 of initiation for an ONU associated therewith.

Step 2: The OLT1 sends an IOC (T_ind, ONU-ID) to an OLT2, and it is shown that the ONU corresponding to a designated ONU-ID is adjusted into the OLT2; and the OLT1 sends a PLOAM message T_C (CH2, SFC) to an ONU1 in a CH1, requests to start being adjusted into a CH2 to work at predetermined time designated by an SFC, and enters a state 200 of start, and a timer T1 is started.

Step 3: If there OLT1 receives a PLOAM message T_R (refusal) in the CH1 or does not receive any PLOAM response message in the CH1, the OLT1 sends a cancellation message IOC (cancellation, ONU non-supporting or no response) to the OLT2; or the OLT1 does not receive any PLOAM response message in the CH1 until the T1 expires, and returns to the state 100 of initiation; or after receiving a PLOAM message T_R (adjustment acknowledgment) in the CH1, the OLT1 enters a state 300 after appointed time (appointed time SFC).

Step 4: If the OLT1 receives a message IOC (arrival acknowledgment, ONU-ID) sent by the OLT2, it is considered that wavelength adjustment for the ONU has succeeded, and enters a state 400 of empty; or if the OLT1 receives a PLOAM message T_R (return) in the CH1 and it is shown that the ONU returns to the CH1 to work, the OLT1 sends an IOC (returned, ONU-ID) to the OLT2, and enters the state 100; or if a timer T1 expires, the OLT1 sends an IOC (Alert, ONU-ID) to the OLT2, and enters the state 100.

FIG. 11 is a flow diagram illustrating state transfer of a target OLT1 state machine according to a preferred embodiment of the disclosure. Referring to FIG. 11, the working flow may include the steps as follows.

Step 1: An OLT2 automatically creates a state 100 of empty for all ONU-IDs out of a working range thereof Step 2: The OLT2 receives an IOC (T_ind, ONU-ID, and channel information about a TWDM CH of a source OLT) sent by an OLT1, the OLT2 enters a state 200, and a timer T2 is started.

Step 3: If the OLT2 receives a PLOAM message T_R (arrival) sent by an ONU in a CH2, the OLT2 sends a PLOAM message T_C (completion) to the ONU in the CH2, sends an IOC (arrival acknowledgment, ONU-ID) to the OLT1, and enters the state 100 of initiation; if the timer T2 expires, the OLT2 sends an IOC (Alert, ONU-ID) to an OLT1, and it is shown that it returns to a state 400 of empty when the OLT2 does not wait for arrival information about the ONU; or, the OLT2 refuses to receive the ONU, and sends an IOC (refusal, ONU-ID) to the OLT1; or, the OLT2 receives a cancellation message IOC (cancellation, ONU non-supporting or no response) sent by the OLT1, it is shown that the ONU does not support to be adjusted back, and the OLT2 returns to the state 400 of empty; or the OLT2 receives an IOC (returned, ONU-ID) sent by the OLT1, it is shown that the ONU has returned to a CH1 of the OLT1, and in this case, the OLT2 returns to the state 400 of empty.

Figure 12:
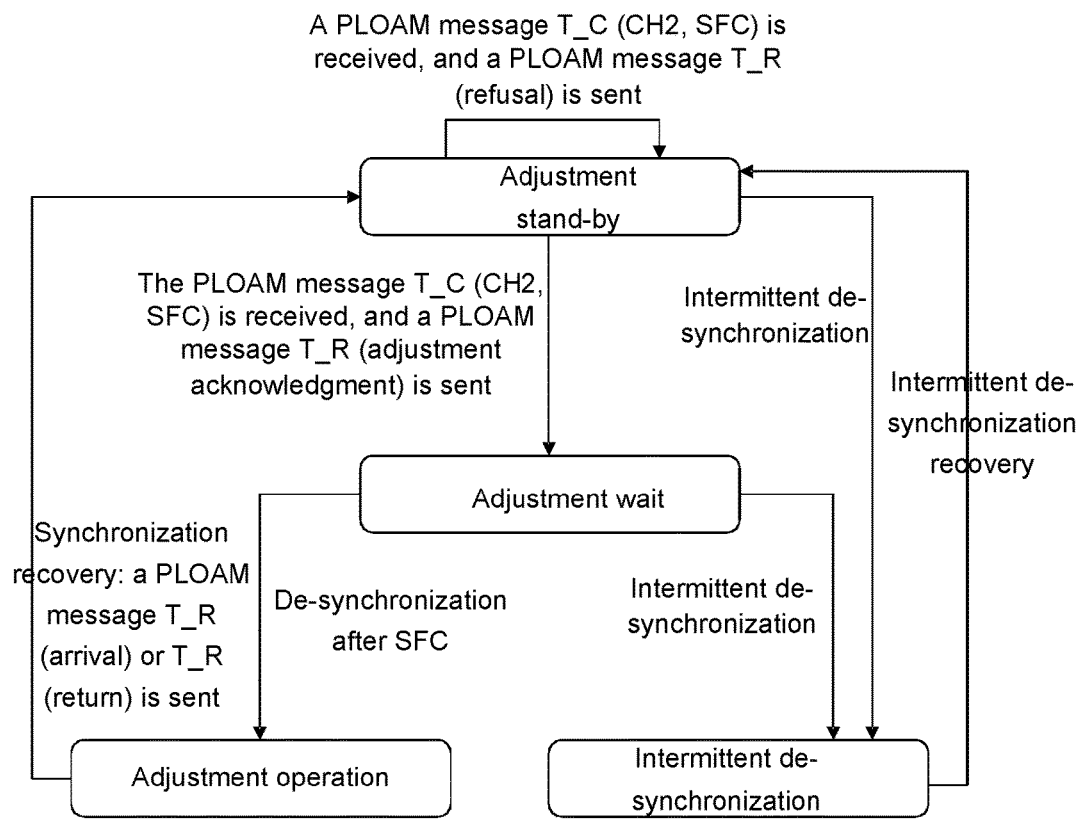
FIG. 12 is a flow diagram illustrating state transfer of an ONU state machine according to a preferred embodiment of the disclosure.

FIG. 12 is a flow diagram illustrating state transfer of an ONU state machine according to a preferred embodiment of the disclosure. Referring to FIG. 12, the working flow may include the steps as follows.

Step 1: When working normally, an ONU stays under an adjustment stand-by state.

Step 2: Under the adjustment stand-by state, when the ONU receives a PLOAM message T_C (CH2, SFC) and sends a PLOAM message T_R (refusal), the ONU still stays under the adjustment stand-by state; when the ONU receives the PLOAM message T_C (CH2, SFC) and sends a PLOAM message T_R (adjustment acknowledgment), the ONU enters an adjustment wait state; and when the ONU detects an intermittent de-synchronization event, the ONU enters an intermittent de-synchronization state.

Step 3: Under the adjustment wait state, if the ONU de-synchronizes after predetermined time determined in accordance with an SFC, the ONU enters an adjustment operation state, and if the ONU de-synchronizes before the predetermined time determined in accordance with the SFC, the ONU enters the intermittent de-synchronization state.

Step 4: Under the adjustment operation state, after the adjustment of the ONU is completed, the ONU will return to the adjustment stand-by state regardless of synchronization recovery in a target OLT2 channel and sending of a PLOAM message T_R (arrival) or synchronization recovery in a source OLT1 and sending of a PLOAM message T_R (return).

It is important to note that all the components may be implemented by hardware. For example, a processor includes all the components, or all the components are located in a processor respectively.

In another embodiment, software is also provided. The software is configured to execute the technical solutions described in the above embodiments and a preferred implementation mode.

In another embodiment, a storage medium is also provided. The software is stored in the storage medium, and the storage medium includes, but is not limited to, an optical disc, a floppy disk, a hard disk, an erasable memory and the like.

From the above description, it may be seen that the disclosure achieves the technical effects as follows. By means of the disclosure, in a mode of setting corresponding communication channels and information interaction logics on a source OLT, an ONU of the source OLT and a target OLT simultaneously, the problem that effective communication channels and information interaction logics are not provided for such communications in a currently existing TWDM PON standard and technical research is solved, so that the ONU of the source OLT can still work normally after being switched to a channel of the target OLT, thereby achieving the effect that the continuity of a service between the OLT and the ONU may be maintained.

Obviously, those skilled in the art shall understand that all components or all steps in the disclosure may be implemented by using a general calculation apparatus, may be centralized on a single calculation apparatus or may be distributed on a network composed of a plurality of calculation apparatuses. Optionally, they may be implemented by using executable program codes of the calculation apparatuses. Thus, they may be stored in a storage apparatus and executed by the calculation apparatuses, the shown or described steps may be executed in a sequence different from this sequence under certain conditions, or they are manufactured into each integrated circuit component respectively, or a plurality of components or steps therein are manufactured into a single integrated circuit component. Thus, the disclosure is not limited to the combination of any specific hardware and software.

The above is only the preferred embodiment of the disclosure, and is not intended to limit the disclosure. There may be various modifications and variations in the disclosure for those skilled in the art. Any modifications, equivalent replacements, improvements and the like within the spirit and principle of the disclosure shall fall within the protection scope of the disclosure.

INDUSTRIAL APPLICABILITY

By means of the embodiments of the disclosure, in a mode of setting corresponding communication channels and information interaction logics on a source OLT, an ONU of the source OLT and a target OLT simultaneously, the problem that effective communication channels and information interaction logics are not provided for such communications in a currently existing TWDM PON standard and technical research is solved, so that the ONU of the source OLT can still work normally after being switched to a channel of the target OLT, thereby achieving the effect that the continuity of a service between the OLT and the ONU may be maintained.

What is claimed is:

1. A method for adjusting wavelength for an Optical Network Unit (ONU) by Optical Line Terminals (OLTs), comprising:
   sending, by a source OLT, an adjustment notification message to a target OLT, to indicate that an ONU is to be adjusted into a Time-Wavelength Division Multiplexing Channel (TWDM CH) of the target OLT;
   sending, by the source OLT, an adjustment command message to the ONU, and starting, by the source OLT, a preset timer of the source OLT, wherein the adjustment command message is used for instructing to adjust the ONU into the TWDM CH of the target OLT;
   under the condition that the source OLT receives a first adjustment acknowledgement message from the ONU before the preset timer of the source OLT expires, receiving, by the source OLT, an arrival acknowledgement message provided by the target OLT after the target OLT receives a second adjustment acknowledgement message from the ONU, wherein the second adjustment acknowledgement message is used for indicating that an adjustment process of the ONU has been completed, the arrival acknowledgement message is used for indicating that the adjustment process of the ONU has been completed; or, under the condition that the source OLT receives the first adjustment acknowledgement message from the ONU before the preset timer of the source OLT expires, receiving, by the source OLT, a return message sent by the ONU, wherein the return message is a report sent to the source OLT by the ONU after adjustment fails.

2. The method as claimed in claim 1, wherein a type of the adjustment command message comprises: a Physical Layer Operation And Maintenance (PLOAM) message; or the adjustment command message carries channel information about the TWDM CH of the target OLT and wavelength adjustment start time.

3. The method as claimed in claim 1, further comprising:

under the condition that the source OLT doesn't receive an adjustment refusal message from the ONU, the first adjustment acknowledgement message, the arrival acknowledgement message, or the return message until the preset timer of the source OLT expires, sending, by the source OLT, an adjustment error message to the target OLT, wherein a type of the adjustment error message comprises: an Inter-OLT-Communication (IOC) message.

4. The method as claimed in claim 1, further comprising:

under the condition that the source OLT receives an adjustment refusal message from the ONU before the preset timer of the source OLT expires, sending, by the source OLT, an adjustment cancellation message to the target OLT; or, receiving, by the source OLT, the first adjustment acknowledgement message from the ONU, wherein a type of the adjustment cancellation message comprises: an IOC message, and types of the adjustment refusal message and the first adjustment acknowledgement message comprise: PLOAM messages.

5. The method as claimed in claim 1, wherein the type of the return message comprises: a PLOAM message.

6. The method as claimed in claim 1, wherein a type of the adjustment notification message comprises: an IOC message.

7. The method as claimed in claim 1, wherein a type of the adjustment acknowledgement message comprises: an IOC message.

8. An apparatus for adjusting wavelength for an Optical Network Unit (ONU) by Optical Line Terminals (OLTs), located at a source OLT, the apparatus comprising a hardware processor, configured to perform programming components stored in a memory, wherein the programming components comprise:

a first sending component, configured to send an adjustment notification message to a target OLT, wherein the adjustment notification message is used for indicating that an ONU is to be adjusted into a Time-Wavelength Division Multiplexing Channel (TWDM CH) of the target OLT;

a second sending component, configured to send an adjustment command message to the ONU needing to be adjusted, wherein the adjustment command message is used for indicating that the ONU needing to be adjusted is adjusted into the TWDM CH of the target OLT; and a start component, configured to start a preset timer of the source OLT;

a receiving component, configured to, under the condition that the source OLT receives a first adjustment acknowledgement message from the ONU before the preset timer of the source OLT expires, receive an arrival acknowledgement message provided by the target OLT after the target OLT receives a second adjustment acknowledgement message from the ONU, wherein the second adjustment acknowledgement message is used for indicating that an adjustment process of the ONU has been completed, the arrival acknowledgement message is used for indicating that the adjustment process of the ONU has been completed; or, the apparatus is further configured to, under the condition that the source OLT receives the first adjustment acknowledgement message from the ONU before the preset timer of the source OLT expires, receive a return message sent by the ONU, wherein the return message is a report sent to the source OLT by the ONU after adjustment fails.

9. The apparatus as claimed in claim 8, wherein a type of the adjustment command message comprises: a Physical Layer Operation And Maintenance (PLOAM) message.

10. The apparatus as claimed in claim 8, wherein the adjustment command message carries channel information about the TWDM CH of the target OLT and wavelength adjustment start time.

11. A method for adjusting wavelength for an Optical Network Unit (ONU) by Optical Line Terminals (OLTs), comprising:

receiving, by a target OLT, an adjustment notification message sent by a source OLT, and starting a preset timer of the target OLT, wherein the adjustment notification message is used for indicating that an ONU is to be adjusted into a Time-Wavelength Division Multiplexing Channel (TWDM CH) of the target OLT; and under the condition that the target OLT receives a second adjustment acknowledgment message from the ONU before the preset timer of the target OLT expires, sending, by the target OLT, an arrival acknowledgment message to the source OLT, wherein the second adjustment acknowledgment message is used for indicating that an adjustment process of the ONU has been completed, the arrival acknowledgment message is used for indicating that the adjustment process of the ONU has been completed.

12. The method as claimed in claim 11, wherein types of the adjustment notification message and the adjustment acknowledgment message comprise: Inter-OLT-Communication (IOC) messages.

13. The method as claimed in claim 11, wherein under the condition that the target OLT doesn't receive the second adjustment acknowledgement message, a cancellation message sent by the source OLT, or a returned message sent by the source OLT until the preset timer of the target OLT expires, sending, by the target OLT, an adjustment error message to the source OLT, wherein a type of the adjustment error message comprises: an Inter-OLT-Communication (IOC) message.

14. An apparatus for adjusting wavelength for an Optical Network Unit (ONU) by Optical Line Terminals (OLTs), located at a target OLT, the apparatus comprising a hardware processor, configured to perform programming components stored in a memory, wherein the programming components comprise:

a receiving component, configured to receive an adjustment notification message sent by a source OLT, wherein the adjustment notification message is used for indicating that an Optical Network Unit (ONU) is to be adjusted into a Time-Wavelength Division Multiplexing Channel (TWDM CH) of the target OLT;
a start component, configured to start a preset timer of the target OLT; and
a sending component, configured to, under the condition that the target OLT receives a second adjustment acknowledgment message from the ONU before the preset timer of the target OLT expires, send an arrival acknowledgment message to the source OLT, wherein the second adjustment acknowledgment message is used for indicating that an adjustment process of the ONU has been completed, the arrival acknowledgment message is used for indicating that the adjustment process of the ONU has been completed.

15. A method for adjusting wavelength for an Optical Network Unit (ONU), comprising:
sending, by the ONU, a first adjustment acknowledgment message to a source Optical Line Terminal (OLT), and entering an adjustment waiting state after the ONU receives an adjustment command message from the source OLT, wherein the adjustment command message is used for instructing to adjust the ONU into a TWDM CH of a target OLT; and
when a downlink out-of-synchronization event is detected before wavelength adjustment start time indicated by the source OLT arrives entering, by the ONU, an intermittent de-synchronization state, or, after the wavelength adjustment start time arrives, entering, by the ONU, an adjustment operation state.

16. The method as claimed in claim 15, further comprising:
after the adjustment operation state is ended, sending, by the ONU, a second adjustment acknowledgment message to the target OLT or a return message to the source OLT, wherein the second adjustment acknowledgment message is used for indicating that an adjustment process of the ONU has been completed, and the return message is a report sent to the source OLT by the ONU after adjustment fails.

17. An apparatus for adjusting wavelength for an Optical Network Unit (ONU), located at an ONU, the apparatus comprising a hardware processor, configured to perform programming components stored in a memory, wherein the programming components comprise:
a sending component, configured to send a first adjustment acknowledgment message to a source Optical Line Terminal (OLT) and enter an adjustment waiting state after the ONU receives an adjustment command message from the source OLT, wherein the adjustment command message is used for instructing to adjust the ONU into a TWDM CH of a target OLT; and
a processing component, configured to enter an intermittent de-synchronization state when a downlink out-of-synchronization event is detected before wavelength adjustment start time indicated by the source OLT arrives or enter an adjustment operation state after the wavelength adjustment start time arrives.

* * * * *